(12) United States Patent
Kavsan

(10) Patent No.: US 8,615,662 B2
(45) Date of Patent: Dec. 24, 2013

(54) PASSWORD AUTHENTICATION VIA A ONE-TIME KEYBOARD MAP

(75) Inventor: Bronislav Kavsan, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 1351 days.

(21) Appl. No.: 11/669,382

(22) Filed: Jan. 31, 2007

(65) Prior Publication Data

US 2008/0184036 A1  Jul. 31, 2008

(51) Int. Cl.
*G06F 21/00* (2013.01)

(52) U.S. Cl.
USPC .......................................... 713/184

(58) Field of Classification Search
USPC .......................................... 713/184
See application file for complete search history.

(56) References Cited

U.S. PATENT DOCUMENTS

| | | | |
|---|---|---|---|
| 5,661,807 A | 8/1997 | Guski et al. | 380/25 |
| 5,664,099 A * | 9/1997 | Ozzie et al. | 726/29 |
| 6,067,621 A | 5/2000 | Yu et al. | 713/172 |
| 6,662,300 B1 | 12/2003 | Peters | 713/182 |
| 6,928,558 B1 | 8/2005 | Allahwerdi et al. | 713/202 |
| 7,705,829 B1 * | 4/2010 | Plotnikov | 345/168 |
| 2003/0231218 A1 * | 12/2003 | Amadio | 345/861 |
| 2004/0059952 A1 | 3/2004 | Newport et al. | 713/202 |
| 2004/0230805 A1 * | 11/2004 | Peinado et al. | 713/181 |
| 2005/0246764 A1 * | 11/2005 | Debrito | 726/5 |
| 2006/0080545 A1 | 4/2006 | Bagley | 713/183 |
| 2006/0083228 A1 | 4/2006 | Ong et al. | 370/389 |
| 2006/0101128 A1 * | 5/2006 | Waterson | 709/212 |
| 2006/0136739 A1 | 6/2006 | Brock et al. | 713/184 |
| 2006/0174105 A1 | 8/2006 | Park | 713/155 |
| 2008/0189790 A1 * | 8/2008 | Park | 726/26 |
| 2010/0023750 A1 * | 1/2010 | Tan | 713/150 |

FOREIGN PATENT DOCUMENTS

| | | | |
|---|---|---|---|
| KR | 10-2002-0012141 | * | 6/2002 |
| WO | WO 2007043761 A1 | * | 4/2007 |

OTHER PUBLICATIONS

TKwon and JSong, Authenticated key exchange protocols resistant to password guessing attacks,Oct. 1998 vol. 45, pp. 304-308.*
Chan, S. et al., "One Time Password Authentication for Open High Performance Computing Environments", Apr. 26, 2004, 14 pages, http://www.es.net/raf/OTP-final.pdf.
Tan, D.S. et al., "Spy-Resistant Keyboard: ore Secure Password Entry on Public Touch Screen Displays", http://research.microsoft.com/vibe/pubs, 10 pages, 2005.
"Enhancing One-Time Passwords for Protection against Real-Time Phishing Attacks", RSA Security, Technology Backgrounder, 2004, http://www.rsasecurity.com/rsalabs/technotes, 12 pages.

* cited by examiner

*Primary Examiner* — Taghi Arani
*Assistant Examiner* — Tracy Mangialaschi
(74) *Attorney, Agent, or Firm* — Woodcock Washburn, LLP

(57) ABSTRACT

A static password is converted into a One-Time Authenticator (OTA) in accordance with a one-time keyboard map. The one-time keyboard map is generated in accordance with a nonce and a secret shared by the user entering the static password and an intended recipient. In response to receiving a prompt to enter a password, a user positions a display cursor within a designated display area. In response thereto, the keyboard driver generates the one-time keyboard map to remap the entered static password. The remapped password is converted into an OTA and transmitted instead of the static password. When the display cursor is moved out of the designated display area, the one-time keyboard map is no longer used to convert keystrokes and the keyboard mapping reverts back to its previous, original configuration.

16 Claims, 6 Drawing Sheets

PASSWORD AUTHENTICATION VIA A ONE-TIME KEYBOARD MAP

TECHNICAL FIELD

The technical field relates generally to computer processing and more specifically to computer security and password protection.

BACKGROUND

Computer security is ubiquitous. One technique for providing computer security is via the use of passwords. Passwords are used for a variety of reasons, such as to gain access to a system or bank account, for example. Passwords are typically entered on a keyboard, and as such are susceptible to interception. A password entered on a keyboard can be monitored via a key stroke logger or the like. Also, a password can be fraudulently obtained via phishing techniques.

SUMMARY

This Summary is provided to introduce a selection of concepts in a simplified form that are further described below in the Detailed Description Of Illustrative Embodiments. This Summary is not intended to identify key features or essential features of the claimed subject matter, nor is it intended to be used to limit the scope of the claimed subject matter.

A password entered on a keyboard, referred to as a static password, is converted to a One-Time Authenticator (OTA), and the OTA is transferred instead of the static password. In an example configuration, when a curser is positioned within a designated area of a display, software in the keyboard driver reconfigures the keyboard keys in accordance with a one-time keyboard map. The keyboard map is generated utilizing a shared secret and nonce. When the user enters the static password, the static password is converted into a one-time password in accordance with the one-time keyboard map. When the display curser is moved out of the designated display area, the software in the keyboard driver returns mapping of the keyboard keys to the original (previous) configuration. The OTA is generated from the one-time password, and provided instead of the static password. In response to receiving the OTA, the OTA is inversely processed to obtain the static password.

BRIEF DESCRIPTION OF THE DRAWINGS

The foregoing summary, as well as the following detailed description, is better understood when read in conjunction with the appended drawings. For the purpose of illustrating password authentication via a one-time keyboard map, there is shown in the drawings exemplary constructions thereof; however, the mechanism for providing a password authentication via a one-time keyboard map is not limited to the specific methods and instrumentalities disclosed.

DETAILED DESCRIPTION OF ILLUSTRATIVE EMBODIMENTS

A static password is converted into a One-Time Authenticator (OTA) in accordance with a one-time keyboard map. In essence, the keyboard functions as an OTP device, achieving equivalent resistance to attacks, without requiring hardware tokens or the like. The one-time keyboard map is generated in accordance with a nonce and a secret (a predetermined value) shared by the user entering the static password and an intended recipient. Prior to entering the static password, the user positions a cursor within a designated area on a display. Positioning the cursor in the designated area enables software in the keyboard driver to generate the one-time keyboard map and to convert keystrokes in accordance with the one-time keyboard map. When the cursor is moved out of the designated area, the one-time keyboard map is no longer used to convert keystrokes. Thus, the keyboard mapping reverts back to its previous, original configuration.

Figure 1:
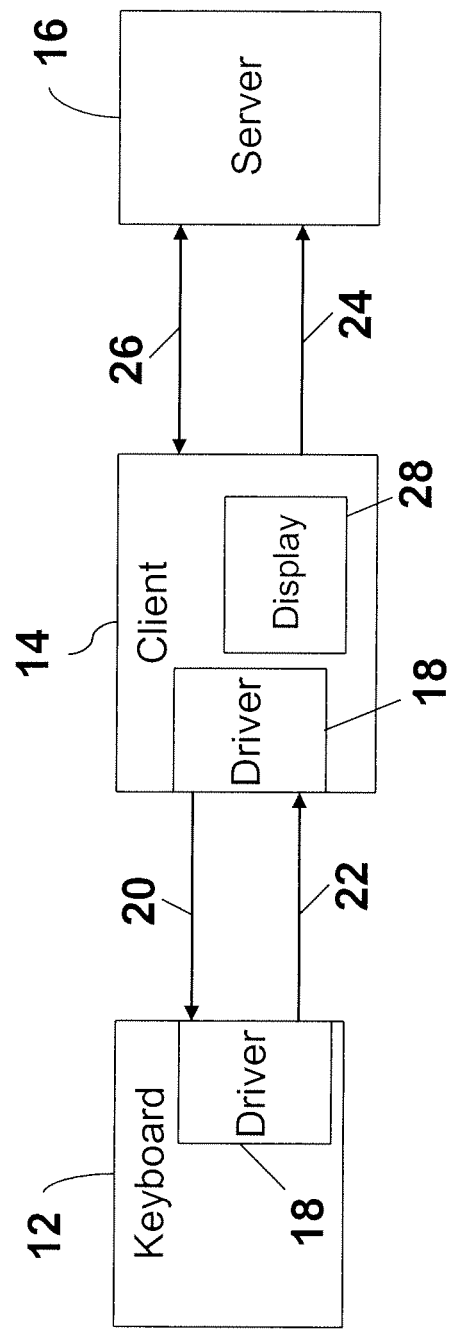
FIG. 1 is a flow diagram of an example process and system for providing password authentication via a one-time keyboard map.

FIG. 1 is a flow diagram of an example process and system for providing password authentication via a one-time keyboard map. Prior to entering a static password, the client 14 and the server 16 establish a secret shared by the client 14 and the server 16. The secret (predetermined value) can be any appropriate secret. For example, the secret could comprise a random number, a value determined in accordance with an agreed upon formula, a cryptographically determined value, or the like. The secret can be established at any appropriate time. For example, the secret can be established when the client enrolls with the server, when the client logs in to the server, or the like.

Figure 2:
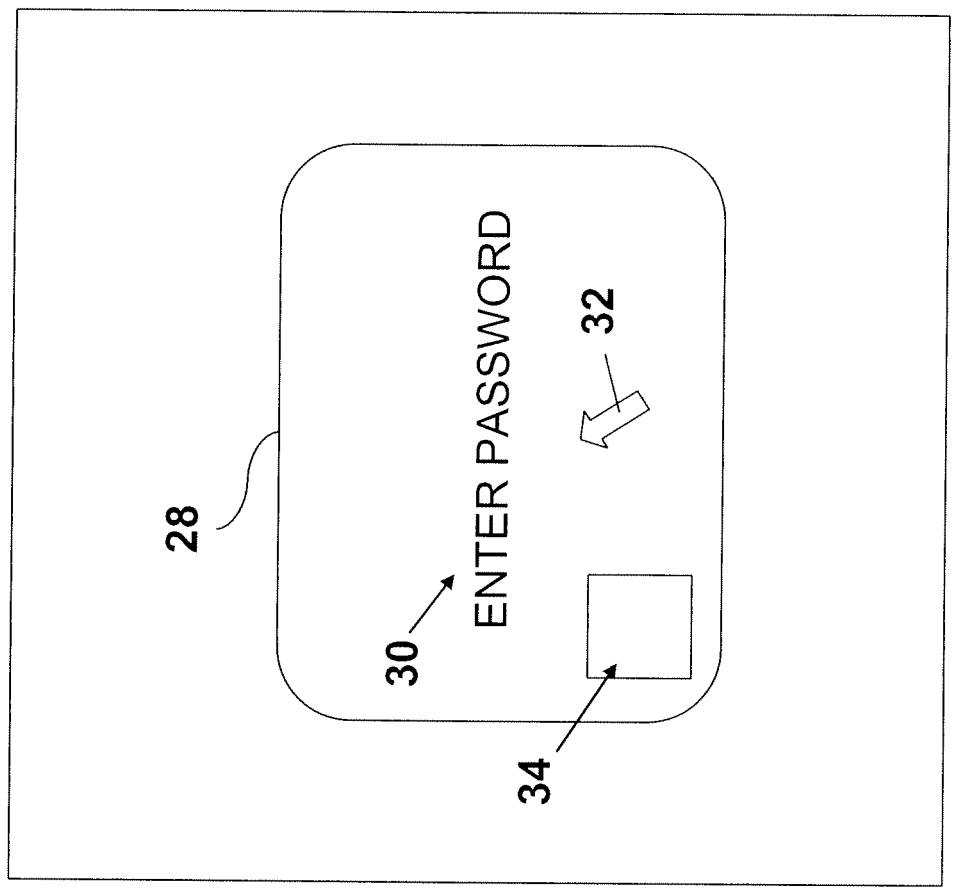
FIG. 2 is an illustration depicting an example logon scenario.

FIG. 2 is an illustration depicting an example logon scenario. During a logon session, or at any appropriate time, the client 14 monitors the interaction between a user of the client 14 and the client 14. In an example embodiment, the client 14 (e.g., software of the client 14) monitors and analyzes information rendered on a display portion 28 of the client 14. When a prompt 30 is rendered on the display portion 28 to enter a password, or the like, the client 14 monitors the position of the display cursor 32. The client 14 is configured to detect when the display cursor 32 is positioned within a designated area 34 of the display portion 28. If the display cursor 32 is positioned within the designated area 34, the generation of the one-time keyboard map is initialized.

Figure 3:
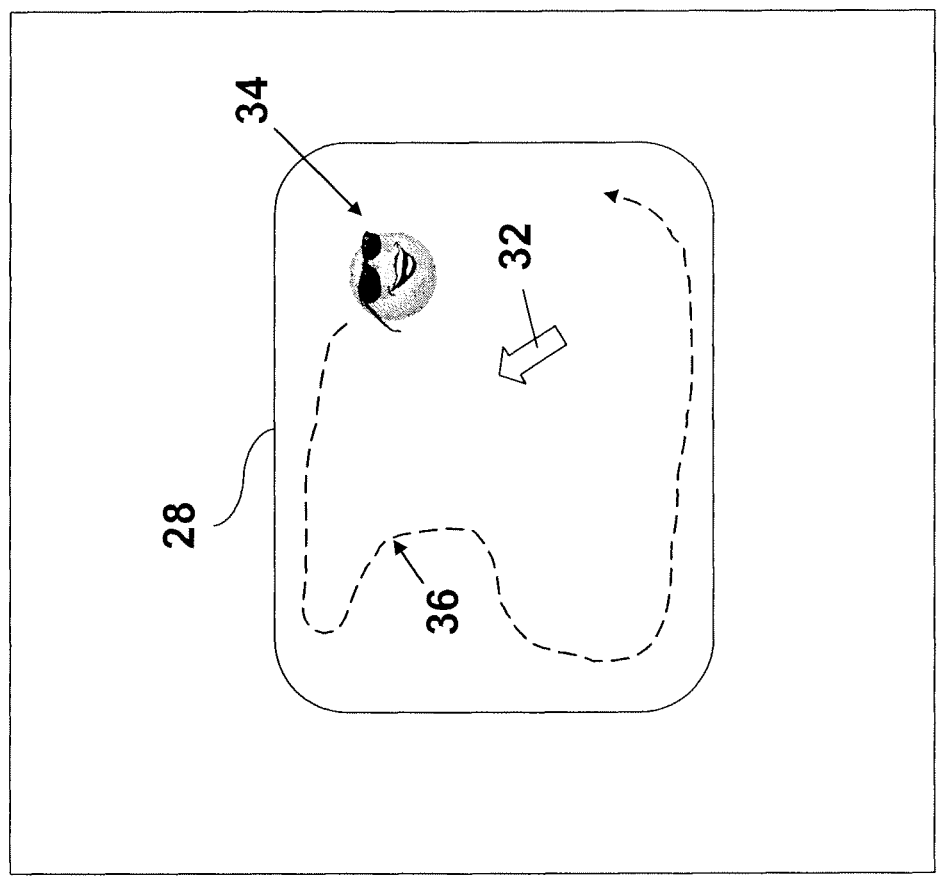
FIG. 3 is an illustration of an example designated display area 34.

FIG. 3 is an illustration of an example designated display area 34. The designated area 34 can be implemented in any appropriate manner. For example, the designated area 34 can be located at a fixed location (e.g., a corner) of the display portion 28. Thus, when the prompt 30 is rendered, the designated display area 34 is consistently located (e.g., non-moving) at the same relative location of the display portion 28. In an example embodiment, the designated area 34 can have rendered therein an indication that it is the designated display area. For example, the designated display area 34 can have text, color, an icon, a flashing icon, or the like, or a combination thereof, rendered therein to indicate that it is the designated display area. Further, as depicted in FIG. 3, the designated display area 34 can comprise a moving icon. The path 36 of the motion can be predetermined and/or random. In this embodiment, when the cursor 32 is positioned within the designated area 34 (e.g., over the icon), the motion of the designated area 34 halts and generation of the one-time keyboard map is initialized.

Referring again to FIG. 1, upon the client 14 detecting that the display cursor 32 is positioned within the designated display area 34, generation of the one-time keyboard map is started. In an example embodiment, software in the keyboard driver 18 generates the one-time keyboard map based on the shared secret and a nonce. Nonces are known in the art. A nonce is a one-time random, or pseudorandom, value used for authentication. Any appropriate nonce can be utilized to generate the one-time keyboard map. For example, the nonce can be time-based, challenged-based, and/or event-based. A time based nonce is computed based on an assumption that the client 14 and the server 16 have synchronized clocks. Thus, the value of the nonce is calculated based on the time indicated on the synchronized clock, within some tolerance. A challenge based nonce comprises a random number communicated to the client 14 by the server 16 during the authentication process. An event based nonce is computed based on the counter value that is incremented each time the client 14 authenticates (e.g., the known HMAC-based OTP algorithm).

At step 20, the one-time keyboard map is provided to the keyboard 12. The user enters the static password on the keyboard 12, and the key strokes of the static password are remapped, by the keyboard driver 18, in accordance with the one-time keyboard map. The keyboard driver generates a One Time Authenticator (OTA) from the remapped keystrokes. In an example embodiment, the OTA is generated by salting the remapped password. That is, a random number of known length is appended to the remapped password. The OTA is provided to the client 14 at step 22. The client 14 provides, at step 24, the OTA to the server 16 in accordance with any appropriate protocol.

In response to receiving the OTA from the client 14, the server 16 computes the static password from the OTA. The server 16 parsed the remapped password from the OTA (the salted remapped password). The server 16 calculates the one-time keyboard map utilizing the shared secret and the nonce used to generate the one-time keyboard map by the driver 18. The server 16 then determines the static password in accordance with the calculated one-time keyboard map.

The client 14 is representative of any appropriate type of device, or devices, that can be utilized with the keyboard 12. The client 14 can represent a processor or multiple processors. Multiple processors can be distributed or centrally located. The client 14 can represent a portable device, or devices, such as, for example, a portable media player, e.g., a portable music player, such as an MP3 player, a walkmans, etc., a portable computing device, such as a laptop, a personal digital assistant ("PDA"), a portable phone, such as a cell phone of the like, a smart phone, a video phone, a portable email device, a thin client, a portable gaming device, etc., or a combination thereof.

Figure 4:
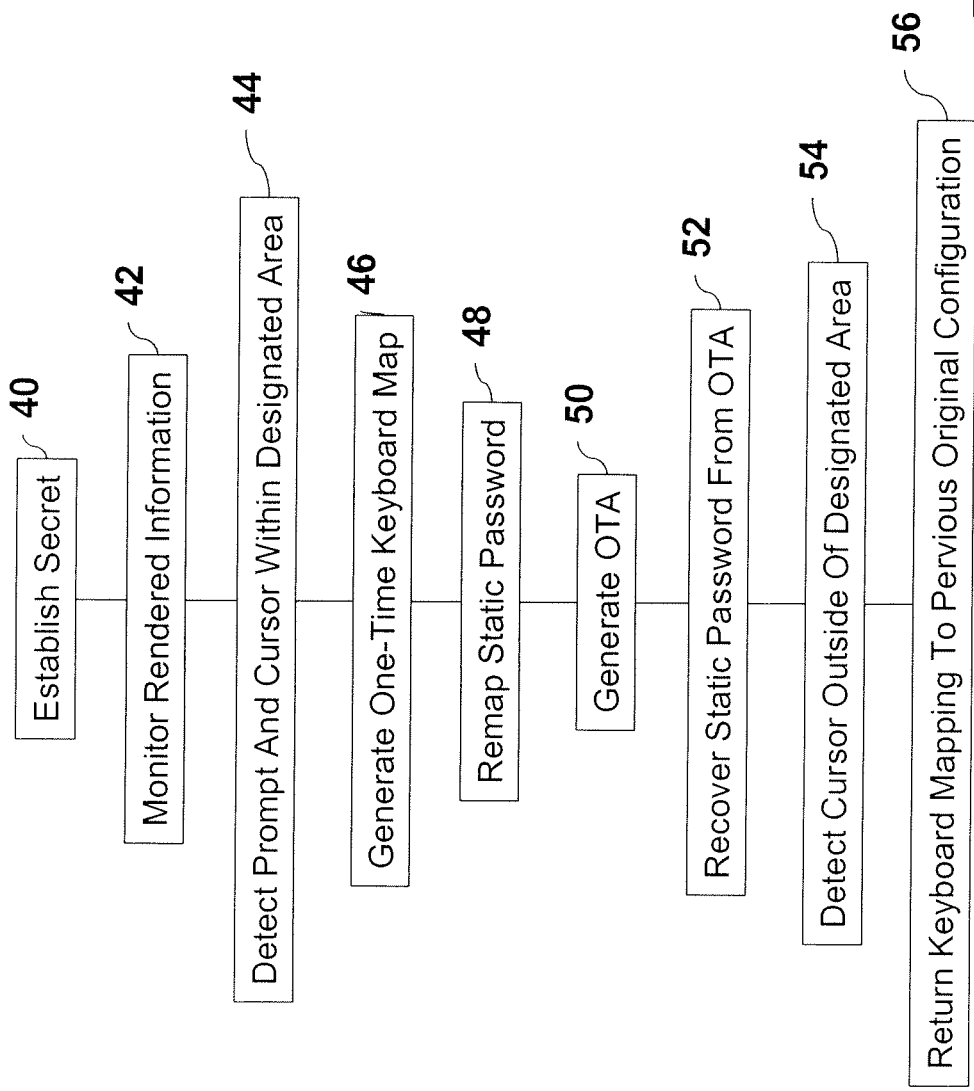
FIG. 4 is a flow diagram of an example process for providing password authentication via a one-time keyboard map.

FIG. 4 is a flow diagram of an example process for providing password authentication via a one-time keyboard map. A secret is established at step 40. As described above, the secret can be any appropriate secret. Information rendered on a display is monitored and analyzed at step 42. At step 44, a prompt indicative of a request to enter a password, or the like is detected. Also detected at step 44, is the positioning of the display cursor within, or overlaying, a designated display area. The one-time keyboard map is generated at step 46. As described above, the one-time keyboard map is generated in response to the display cursor being positioned within the designated display area. The one-time keyboard map is generated, in an example, embodiment, in accordance with the secret and a nonce. The nonce can be a time based nonce, a challenge based nonce, an event based nonce, or a combination thereof.

The static password is remapped utilizing the one-time keyboard map at step 48. That is, the keystrokes of the static password are converted to remapped keystrokes in accordance with the one-time keyboard map. At step 50, the OTA is generated based on the remapped password. In an example embodiment, the OTA is generated by appending a random number, or random numbers, (e.g., salting) to the remapped password. The OTA is provided to another processor, such as a server of the like and the static password is recovered from the OTA at step 52. In an example embodiment, the recipient of the OTA generated one-time keyboard map utilizing the secret and the nonce used in step 46. The random number, or numbers, is parsed from the OTA resulting in the remapped password. The remapped password is converted to the static password in accordance with the one-time keyboard map generated by the recipient of the OTA. At this point, the static password is available for use as intended.

At step 54, the positioning of the display cursor outside of the designated display is detected. When the display cursor is positioned outside of the designated display area, the one-time keyboard map is no longer utilized. The mapping of the keyboard is returned to its previous, original configuration at step 56.

Figure 5:
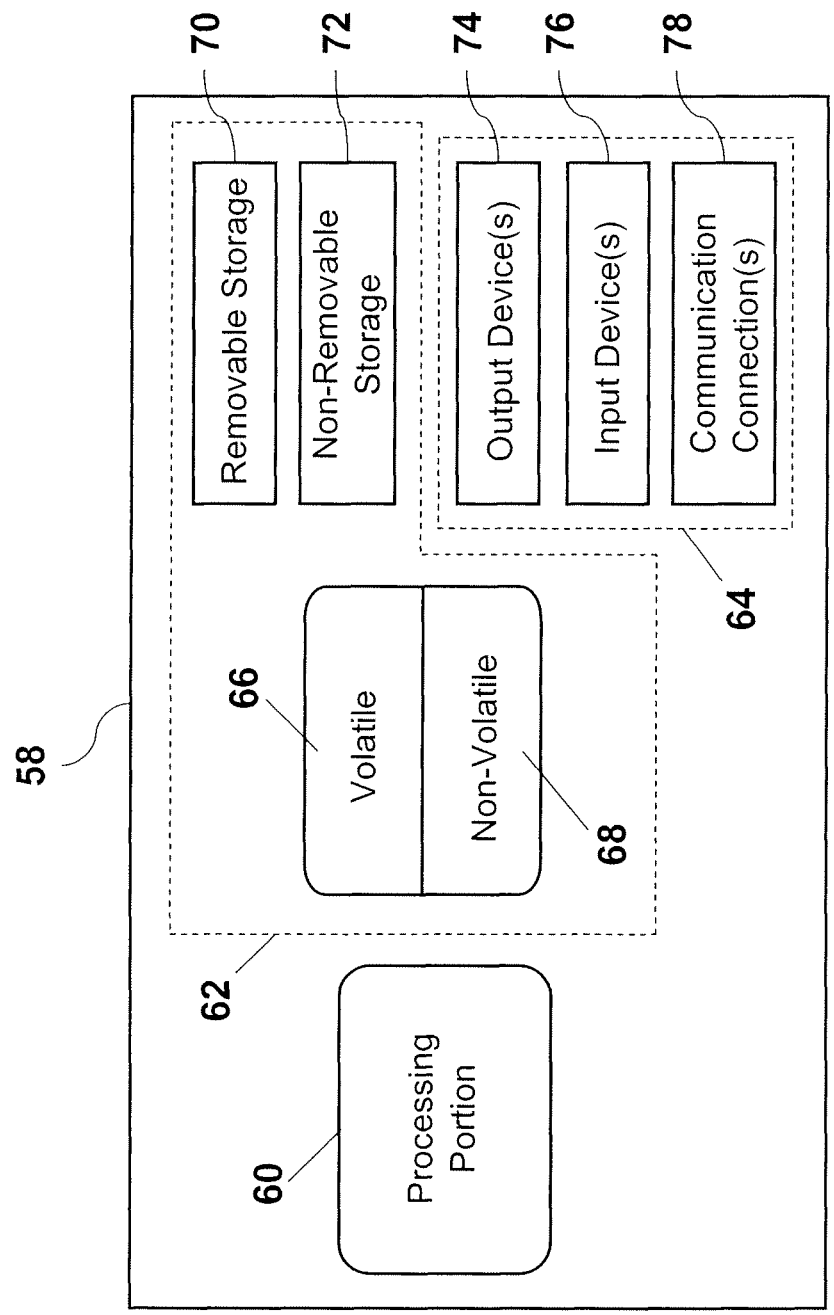
FIG. 5 is a diagram of an exemplary processor for implementing password authentication via a one-time keyboard map.

FIG. 5 is a diagram of an exemplary processor 58 for implementing password authentication via a one-time keyboard map. In an example embodiment, the processor 58 comprises the client 14. In an example embodiment, the processor 58 comprises at least a portion of the keyboard driver 18. The processor 58 comprises a processing portion 60, a memory portion 62, and an input/output portion 64. The processing portion 60, memory portion 62, and input/output portion 64 are coupled together (coupling not shown in FIG. 5) to allow communications therebetween. The input/output portion 64 is capable of providing and/or receiving components utilized to implement password authentication via a one-time keyboard map as described above. The input/output portion 64 is capable of providing and/or receiving a static password, a one-time password, a secret predetermined value, a nonce, an OTA, or a combination thereof, for example.

The processing portion 60 is capable of implementing password authentication via a one-time keyboard map as described above. In an example embodiment, the processing portion 60 comprises at least a portion of the keyboard driver 18. The processing portion 60 also is capable of establishing a secret value to be shared by the client and server, for example. The processing portion 60 is capable of monitoring information rendered on the display portion 28, such as a prompt 30, a display cursor 32, a designated display area 34, or a combination thereof, for example. The processing portion 60 is capable of detecting when the display cursor is within a designated display area. The processing portion 60 is capable of generating a one-time keyboard map. The processing portion 60 is capable of remapping a static password in accordance with the one-time keyboard map. The processing portion 60 is capable of generating a OTA.

The processor 58 can be implemented as a client processor and/or a server processor (e.g., client 14, server 16). In a basic configuration, the processor 58 can include at least one processing portion 60 and memory portion 62. Depending upon the exact configuration and type of processor, the memory portion 62 can be volatile (such as RAM) 66, non-volatile (such as ROM, flash memory, etc.) 68, or a combination thereof. The processor 58 can have additional features/functionality. For example, the processor 58 can include additional storage (removable storage 70 and/or non-removable storage 72) including, but not limited to, magnetic or optical disks, tape, flash, smart cards or a combination thereof. Computer storage media, such as memory portion 62, 66, 68, 70, and 72, include volatile and nonvolatile, removable and non-removable media implemented in any method or technology for storage of information such as computer readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, universal serial bus (USB) compatible memory, smart cards, or any other medium which can be used to store the desired information and which can be accessed by the processor 58. Any such computer storage media can be part of the processor 58.

The processor 58 can also contain communications connection(s) 78 that allow the processor 58 to communicate with other devices. Communications connection(s) 78 is an example of communication media. Communication media typically embody computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media. The processor 58 also can have input device(s) 76 such as keyboard, mouse, pen, voice input device, touch input device, etc. Output device(s) 74 such as a display, speakers, printer, etc. also can be included. In an example embodiment, output device 74 comprises display portion 28.

Figure 6:
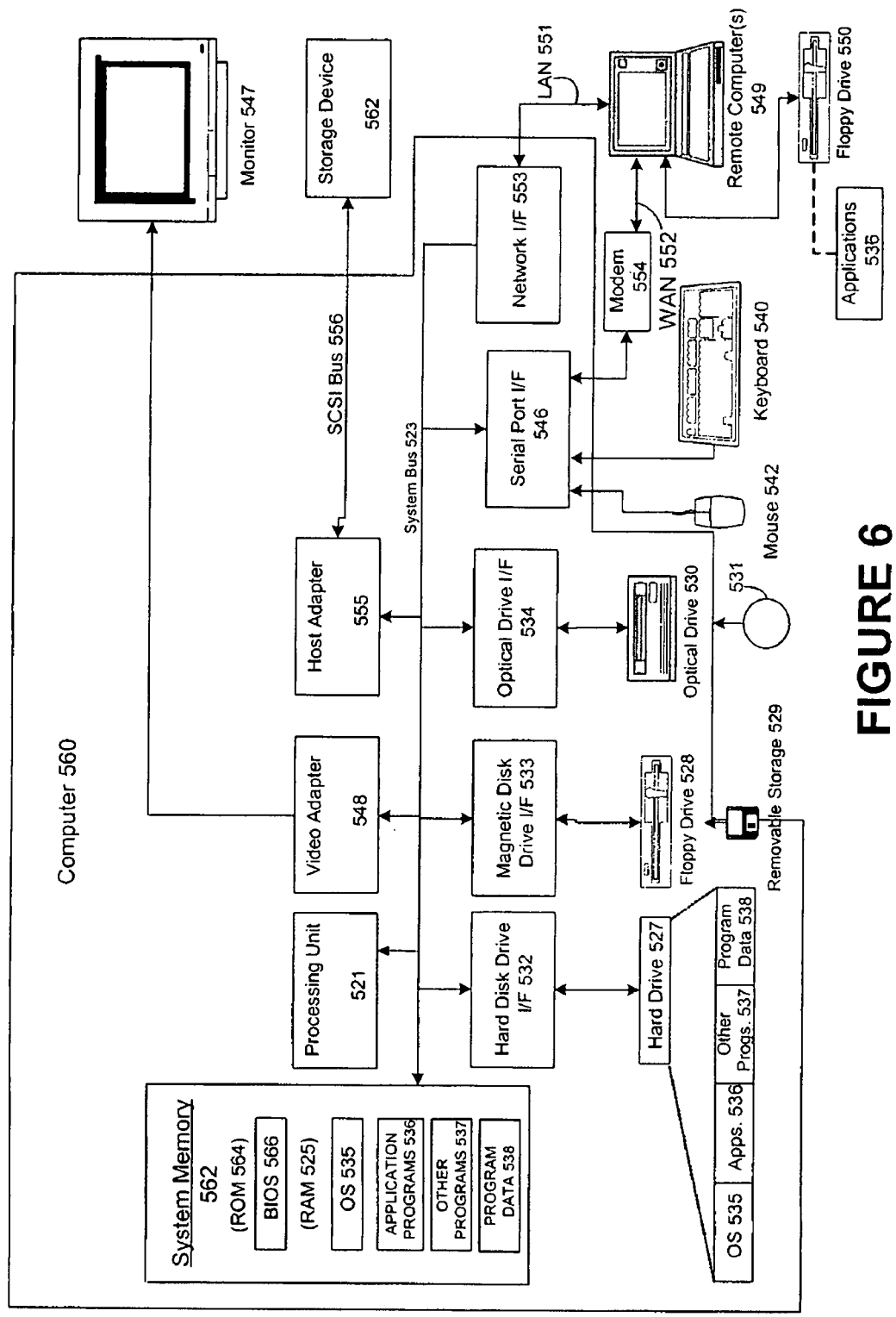
FIG. 6 is a depiction of a suitable computing environment in which password authentication via a one-time keyboard map can be implemented.

FIG. 6 and the following discussion provide a brief general description of a suitable computing environment in which password authentication via a one-time keyboard map can be implemented. Although not required, various aspects of password authentication via a one-time keyboard map can be described in the general context of computer executable instructions, such as program modules, being executed by a computer, such as a client workstation or a server. Generally, program modules include routines, programs, objects, components, data structures and the like that perform particular tasks or implement particular abstract data types. Moreover, implementation of password authentication via a one-time keyboard map can be practiced with other computer system configurations, including hand held devices, multi processor systems, microprocessor based or programmable consumer electronics, network PCs, minicomputers, mainframe computers, and the like. Further, password authentication via a one-time keyboard map also can be practiced in distributed computing environments where tasks are performed by remote processing devices that are linked through a communications network. In a distributed computing environment, program modules can be located in both local and remote memory storage devices.

A computer system can be roughly divided into three component groups: the hardware component, the hardware/software interface system component, and the applications programs component (also referred to as the "user component" or "software component"). In various embodiments of a computer system the hardware component may comprise the central processing unit (CPU) 521, the memory (both ROM 564 and RAM 525), the basic input/output system (BIOS) 566, and various input/output (I/O) devices such as a keyboard 540, a mouse 542, a monitor 547, and/or a printer (not shown), among other things. The hardware component comprises the basic physical infrastructure for the computer system.

The applications programs component comprises various software programs including but not limited to compilers, database systems, word processors, business programs, videogames, and so forth. Application programs provide the means by which computer resources are utilized to solve problems, provide solutions, and process data for various users (machines, other computer systems, and/or end-users). In an example embodiment, application programs perform the functions associated with password authentication via a one-time keyboard map as described above.

The hardware/software interface system component comprises (and, in some embodiments, may solely consist of) an operating system that itself comprises, in most cases, a shell and a kernel. An "operating system" (OS) is a special program that acts as an intermediary between application programs and computer hardware. The hardware/software interface system component may also comprise a virtual machine manager (VMM), a Common Language Runtime (CLR) or its functional equivalent, a Java Virtual Machine (JVM) or its functional equivalent, or other such software components in the place of or in addition to the operating system in a computer system. A purpose of a hardware/software interface system is to provide an environment in which a user can execute application programs.

The hardware/software interface system is generally loaded into a computer system at startup and thereafter manages all of the application programs in the computer system. The application programs interact with the hardware/software interface system by requesting services via an application program interface (API). Some application programs enable end-users to interact with the hardware/software interface system via a user interface such as a command language or a graphical user interface (GUI).

A hardware/software interface system traditionally performs a variety of services for applications. In a multitasking hardware/software interface system where multiple programs may be running at the same time, the hardware/software interface system determines which applications should run in what order and how much time should be allowed for each application before switching to another application for a turn. The hardware/software interface system also manages the sharing of internal memory among multiple applications, and handles input and output to and from attached hardware devices such as hard disks, printers, and dial-up ports. The hardware/software interface system also sends messages to each application (and, in certain case, to the end-user) regarding the status of operations and any errors that may have occurred. The hardware/software interface system can also offload the management of batch jobs (e.g., printing) so that the initiating application is freed from this work and can resume other processing and/or operations. On computers that can provide parallel processing, a hardware/software interface system also manages dividing a program so that it runs on more than one processor at a time.

A hardware/software interface system shell (referred to as a "shell") is an interactive end-user interface to a hardware/software interface system. (A shell may also be referred to as a "command interpreter" or, in an operating system, as an "operating system shell"). A shell is the outer layer of a hardware/software interface system that is directly accessible by application programs and/or end-users. In contrast to a shell, a kernel is a hardware/software interface system's innermost layer that interacts directly with the hardware components.

As shown in FIG. 6, an exemplary general purpose computing system includes a conventional computing device 560 or the like, including a processing unit 521, a system memory 562, and a system bus 523 that couples various system components including the system memory to the processing unit 521. The system bus 523 may be any of several types of bus structures including a memory bus or memory controller, a peripheral bus, and a local bus using any of a variety of bus architectures. The system memory includes read only memory (ROM) 564 and random access memory (RAM) 525. A basic input/output system 566 (BIOS), containing basic routines that help to transfer information between elements within the computing device 560, such as during start up, is stored in ROM 564. The computing device 560 may further include a hard disk drive 527 for reading from and writing to a hard disk (hard disk not shown), a magnetic disk drive 528 (e.g., floppy drive) for reading from or writing to a removable magnetic disk 529 (e.g., floppy disk, removal storage), and an optical disk drive 530 for reading from or writing to a removable optical disk 531 such as a CD ROM or other optical media. The hard disk drive 527, magnetic disk drive 528, and optical disk drive 530 are connected to the system bus 523 by a hard disk drive interface 532, a magnetic disk drive interface 533, and an optical drive interface 534, respectively. The drives and their associated computer readable media provide non volatile storage of computer readable instructions, data structures, program modules and other data for the computing device 560. Although the exemplary environment described herein employs a hard disk, a removable magnetic disk 529, and a removable optical disk 531, it should be appreciated by those skilled in the art that other types of computer readable media which can store data that is accessible by a computer, such as magnetic cassettes, flash memory cards, digital video disks, Bernoulli cartridges, random access memories (RAMs), read only memories (ROMs), and the like may also be used in the exemplary operating environment. Likewise, the exemplary environment may also include many types of monitoring devices such as heat sensors and security or fire alarm systems, and other sources of information.

A number of program modules can be stored on the hard disk, magnetic disk 529, optical disk 531, ROM 564, or RAM 525, including an operating system 535, one or more application programs 536, other program modules 537, and program data 538. A user may enter commands and information into the computing device 560 through input devices such as a keyboard 540 and pointing device 542 (e.g., mouse). Other input devices (not shown) may include a microphone, joystick, game pad, satellite disk, scanner, or the like. These and other input devices are often connected to the processing unit 521 through a serial port interface 546 that is coupled to the system bus, but may be connected by other interfaces, such as a parallel port, game port, or universal serial bus (USB). A monitor 547 or other type of display device is also connected to the system bus 523 via an interface, such as a video adapter 548. In addition to the monitor 547, computing devices typically include other peripheral output devices (not shown), such as speakers and printers. The exemplary environment of FIG. 6 also includes a host adapter 555, Small Computer System Interface (SCSI) bus 556, and an external storage device 562 connected to the SCSI bus 556.

The computing device 560 may operate in a networked environment using logical connections to one or more remote computers, such as a remote computer 549. The remote computer 549 may be another computing device (e.g., personal computer), a server, a router, a network PC, a peer device, or other common network node, and typically includes many or all of the elements described above relative to the computing device 560, although only a memory storage device 550 (floppy drive) has been illustrated in FIG. 6. The logical connections depicted in FIG. 6 include a local area network (LAN) 551 and a wide area network (WAN) 552. Such networking environments are commonplace in offices, enterprise wide computer networks, intranets and the Internet.

When used in a LAN networking environment, the computing device 560 is connected to the LAN 551 through a network interface or adapter 553. When used in a WAN networking environment, the computing device 560 can include a modem 554 or other means for establishing communications over the wide area network 552, such as the Internet. The modem 554, which may be internal or external, is connected to the system bus 523 via the serial port interface 546. In a networked environment, program modules depicted relative to the computing device 560, or portions thereof, may be stored in the remote memory storage device. It will be appreciated that the network connections shown are exemplary and other means of establishing a communications link between the computers may be used.

While it is envisioned that numerous embodiments of password authentication via a one-time keyboard map are particularly well-suited for computerized systems, nothing in this document is intended to limit the invention to such embodiments. On the contrary, as used herein the term "computer system" is intended to encompass any and all devices capable of storing and processing information and/or capable of using the stored information to control the behavior or execution of the device itself, regardless of whether such devices are electronic, mechanical, logical, or virtual in nature.

The various techniques described herein can be implemented in connection with hardware or software or, where appropriate, with a combination of both. Thus, the methods and apparatuses for implementing password authentication via a one-time keyboard map, or certain aspects or portions thereof, can take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for implementing password authentication via a one-time keyboard map.

The program(s) can be implemented in assembly or machine language, if desired. In any case, the language can be a compiled or interpreted language, and combined with hardware implementations. The methods and apparatuses for implementing password authentication via a one-time keyboard map also can be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like. When implemented on a general-purpose processor, the program code combines with the processor to provide a unique apparatus that operates to invoke the functionality of password authentication via a one-time keyboard map. Additionally, any storage techniques used in connection with password authentication via a one-time keyboard map can invariably be a combination of hardware and software.

While password authentication via a one-time keyboard map has been described in connection with the example embodiments of the various figures, it is to be understood that other similar embodiments can be used or modifications and additions can be made to the described embodiments for performing the same functions of password authentication via a one-time keyboard map without deviating therefrom. Therefore, password authentication via a one-time keyboard map as described herein should not be limited to any single embodiment, but rather should be construed in breadth and scope in accordance with the appended claims.

What is claimed:

1. A method comprising:
using a keyboard driver to generate a one-time keyboard map that maps keystrokes received using a physical keyboard to remapped keystrokes, the one-time keyboard map is generated in response to detecting a display cursor within a designated display area, or a rendered prompt to enter a password, the designated display area comprises at least one of a moving display area or moving icon;
halting motion of a moving designated display area when a cursor is positioned in the designated display area;
initializing the generation of a one-time keyboard map based on the halting of the moving designated display area and the position of the cursor in the designated display area;
converting keystrokes received using the physical keyboard and indicative of a static password in accordance with the one-time keyboard map to generate remapped keystrokes and a remapped password comprising the remapped keystrokes; and
generating a one-time authenticator from the remapped password.

2. The method in accordance with claim 1, wherein the one-time keyboard map is generated in accordance with at least one of:
a predetermined value; or
a nonce.

3. The method in accordance with claim 1 further comprising:
detecting the display cursor outside of the designated display area; and
in response to detecting the display cursor outside of the designated display area, returning a keyboard mapping to a previous configuration.

4. The method in accordance with claim 1, further comprising providing the one-time authenticator instead of the static password.

5. The method in accordance with claim 1, further comprising generating of the one-time authenticator comprises appending a random number to the remapped password.

6. The method in accordance with claim 1, further comprising:
the designated display area comprising an icon that moves within the designated display area, the icon serving to indicate a location of the designated display area, wherein the one-time keyboard map is generated in response to detection of the display cursor within the designated display area;
detecting the display cursor outside of the designated display area; and
in response to detecting the display cursor outside of the designated display area, returning a keyboard mapping to a previous configuration.

7. An authentication processor comprising:
a display portion configured to:
render a prompt to enter a password;
render a display cursor; and
render a moving designated display area, the designated display area comprises at least one of a moving display area or moving icon; and
a processing portion configured to:
detect the display cursor within the designated display area;
detect movement of the moving designated display area; and
generate a one-time authenticator from a remapped password; and
a keyboard driver configured to:
generate a one-time keyboard map that maps keystrokes received using a keyboard to remapped keystrokes, in response to detection of:
the display cursor within the designated display area and halted movement of the display area; and
convert keystrokes received using the keyboard and indicative of a static password in accordance with the one-time keyboard map to generate remapped keystrokes and a remapped password comprising the remapped keystrokes.

8. The processor in accordance with claim 7, wherein the one-time keyboard map is generated in accordance with at least one of:
a predetermined value; or
a nonce.

9. The processor in accordance with claim 7, the processing portion further configured to:
detect the display cursor outside of the designated display area; and
in response to detecting the display cursor outside of the designated display area, returning a keyboard mapping to a previous configuration.

10. The processor in accordance with claim 7, the processing portion further configured to provide the one-time authenticator instead of the static password.

11. The processor in accordance with claim 7, wherein the one-time authenticator comprises a random number appended to the remapped password.

12. A computer-readable storage medium, that is not a transient signal, having stored thereon computer-executable instructions for authenticating a password in accordance with a one-time keyboard map, the computer-executable instructions comprising instructions for:
in response to detecting at least one of a rendered prompt to enter a password and a display cursor within a moving designated display area, the moving designated display area comprising at least one of a moving display area or a moving icon, halting movement of the moving designated display area;
using a keyboard driver to generate the one-time keyboard map that maps keyboard strokes received using a physical keyboard to remapped keystrokes;
converting keystrokes received using the keyboard and indicative of a static password in accordance with the one-time keyboard map to generate remapped keystrokes and a remapped password comprising the remapped keystrokes; and
generating a one-time authenticator from the remapped password.

13. The computer-readable storage medium in accordance with claim 12, wherein the one-time keyboard map is generated in accordance with at least one of:
   a predetermined value; or
   a nonce.

14. The computer-readable storage medium in accordance with claim 13, wherein the nonce comprises at least one of a time-based nonce, a challenged-based nonce, and an event-based nonce.

15. The computer-readable storage medium in accordance with claim 12, the computer-executable instructions further for providing the one-time authenticator instead of the static password.

16. The computer-readable storage medium in accordance with claim 12, the computer-executable instructions further for generating the one-time authenticator by appending a random number to the remapped password.

\* \* \* \* \*